United States Patent
Aweya

(10) Patent No.: US 9,671,822 B2
(45) Date of Patent: Jun. 6, 2017

(54) METHOD AND DEVICES FOR TIME TRANSFER USING END-TO-END TRANSPARENT CLOCKS

(71) Applicants: Khalifa University of Science, Technology, and Research, Abu Dhabi (AE); British Telecommunications plc, London (GB); Emirates Telecommunications Corporation, Abu Dhabi (AE)

(72) Inventor: James Aweya, Abu Dhabi (AE)

(73) Assignees: Khalifa University of Science, Technology and Research, Abu Dhabi (AE); British Telecommunications plc, London (GB); Emirates Telecommunications Corporation, Abu Dhabi (AE)

(*) Notice: Subject to any disclaimer, the term of this patent is extended or adjusted under 35 U.S.C. 154(b) by 222 days.

(21) Appl. No.: 14/566,990

(22) Filed: Dec. 11, 2014

(65) Prior Publication Data

US 2016/0170440 A1 Jun. 16, 2016

(51) Int. Cl.
*G06F 1/12* (2006.01)
*H04L 29/06* (2006.01)
*G06F 1/10* (2006.01)

(52) U.S. Cl.
CPC .................. *G06F 1/12* (2013.01); *G06F 1/10* (2013.01); *H04L 69/28* (2013.01)

(58) Field of Classification Search
CPC ....................................................... G06F 1/04
See application file for complete search history.

(56) References Cited

U.S. PATENT DOCUMENTS

| 8,873,589 B2* | 10/2014 | Aweya | H04J 3/0667 370/503 |
| 8,959,381 B2* | 2/2015 | Aweya | G06F 1/04 709/203 |
| 2013/0080817 A1* | 3/2013 | Mihelic | H04J 3/0667 713/401 |
| 2013/0182806 A1* | 7/2013 | Obradovic | H04L 7/04 375/356 |

OTHER PUBLICATIONS

ITU-T Recommendation G.8271/Y.1366, Time and phase synchronization aspects of packet networks, Feb. 2012.
R. E. Kalman, "A New Approach to Linear Filtering and Prediction Problems," Transaction of the ASME—Journal of Basic Engineering, Mar. 1960, pp. 35-45.

* cited by examiner

*Primary Examiner* — Kim Huynh
*Assistant Examiner* — Eric Chang
(74) *Attorney, Agent, or Firm* — Calfee, Halter & Griswold, LLP

(57) ABSTRACT

This invention relates to methods and devices for time transfer. The invention has particular application in the alignment of slave clocks to a master clock and dealing with packet delay variations. In embodiments of the invention, the slave clock uses the residence times measured by end-to-end transparent clocks to compensate for clock synchronization errors that arise due to variability in message transfer delays. Embodiments provide a simple linear approximation technique and a Kalman filter-based technique for estimating offset and skew of the slave clock.

12 Claims, 8 Drawing Sheets

METHOD AND DEVICES FOR TIME TRANSFER USING END-TO-END TRANSPARENT CLOCKS

FIELD OF THE INVENTION

The present invention relates to methods and devices for time transfer using transparent clocks. It is particularly, but not exclusively, concerned with methods and devices which make use of the residence times recorded by the transparent clocks.

BACKGROUND OF THE INVENTION

IEEE 1588 PTP is now the industry accepted packet-based standard for distributing timing information from a master to enable the clocks of distributed systems to be synchronized with high precision (accuracies in the nano-second levels). It is also designed for applications that cannot bear the cost of a GPS receiver at each node, or for which GPS signals are inaccessible. Relying on GPS for clock synchronization is not always practical (e.g., a base station may be in a tunnel or a large indoor facility) or its acceptance in certain regions of the world may be hindered by policies based on the reasoning that GPS is American owned. Hence, transferring timing via packet transport is a relevant synchronization technique that must coexist and interoperate with all others. However, the challenge here is packet delay variation (PDV) which represents a considerable noise component in the clock recovery system.

The IEEE 1588 PTP standard defines a wide range of synchronization capabilities except the clock recovery mechanisms (servo algorithm, phase-locked loop (PLL), timers, etc.) to be used at the receiver (slave) to synchronize its local clock to the master. The last pieces are vendor and proprietary solutions and are often product differentiators.

The slave clock synchronization accuracy is heavily dependent upon how well the path delay experienced by the PTP message between master and slave is known. Any non-deterministic delays within this path will translate to an error in the time offset calculations, thus degrading the synchronization accuracy unless compensated for. The non-deterministic latency behavior on the path is a consequence of the resource contention and store and forward architecture of packet transport, which consequently decrease time synchronization accuracies. As described below, IEEE 1588 end-to-end ("E2E") transparent clocks ("TCs") measure and update for the device residence time (device transit time) in a field of the PTP message. These updates allow the slave clock to compensate for the variability that exists on the path when synchronizing its clock to the master clock.

Overview of IEEE 1588v2 PTP

The GrandMaster (GM) is the root timing reference in a domain and transmits synchronization information to the clocks residing in its domain. In IEEE 1588v2 PTP messages are categorized into event and general messages. All IEEE 1588 PTP messages have a common header. Event messages are timed messages in that an accurate timestamp is generated at both transmission and receipt of each message. Event messages have to be accurately timestamped since the accuracy in transmission and receipt timestamps directly affects clock distribution accuracy. A timestamp event is generated at the time of transmission and reception of any event message. General messages are not required to be timestamped. The set of event messages consists of Sync, Delay_Req, Pdelay_Req, and Pdelay_Resp. The set of general messages consists of Announce, Follow_Up, Delay_Resp, Pdelay_Resp_Follow_Up, Management, and Signaling.

IEEE 1588 PTP allows for two different types of time-stamping methods, either one-step or two-step. One-step clocks update time information within event messages (Sync and Delay-Req) on-the-fly, while two-step clocks convey the precise timestamps of packets in general messages (Follow_Up and Delay-Resp).

The Sync, Delay_Req, Follow_Up, and Delay_Resp messages are used to generate and communicate the timing information needed to synchronize ordinary and boundary clocks (see description below) using the delay request-response mechanism. A Sync message is transmitted by a master to its slaves and either contains the exact time of its transmission or is followed by a Follow_Up message containing this time. In a two-step ordinary or boundary clock, the Follow_Up message communicates the value of the departure timestamp for a particular Sync message. A Delay_Req message is a request for the receiving node to return the time at which the Delay_Req message was received, using a Delay_Resp message.

The basic pattern of synchronization message exchanges for the one-step and two-step clocks are illustrated in FIG. 1 and FIG. 2, respectively. The message exchange pattern for the two-step clock can be explained as follows. The master 1 sends a Sync message to the slave 3 over network 2 and notes the time T1 at which it was sent. The slave 3 receives the Sync message and notes the time of reception T2. The master 1 conveys to the slave the timestamp T1 by one of two ways: 1) Embedding the timestamp T1 in the Sync message. This requires some sort of hardware processing (i.e., hardware timestamping) for highest accuracy and precision. 2) Embedding the timestamp T1 in a Follow_Up message. Next, the slave sends a Delay_Req message to the master and notes the time T3 at which it was sent. The master 1 receives the Delay_Req message and notes the time of reception T4. The master 1 conveys to the slave 3 the timestamp T4 by embedding it in a Delay_Resp message.

At the end of this PTP messages exchange, the slave 3 possesses all four timestamps {T1, T2, T3, T4}. These timestamps may be used to compute the offset of the slave's clock 5 with respect to the master's clock 4 and the mean propagation time of messages between the two clocks. The computation of offset and propagation time often assumes that the master-to-slave and slave-to-master propagation times are equal, i.e. a symmetrical communication path.

IEEE 1588 ordinary clocks and boundary clocks configured for the delay request-response mechanism use the following event messages to generate and communicate timing information—Sync, Delay_Req, Follow_Up, Delay_Resp. The delay request-response mechanism is used to measure the path delay between a master and an ordinary or boundary clock. Peer-to-peer transparent clocks use a similar mechanism called the peer delay mechanism but with different PTP messages.

Path Delay Measurements and Time Synchronization

IEEE 1588 PTP requires an accurate measurement of the communication path delay between the time server (master) 1 and the client (slave) 3 for clock synchronization. PTP measures the exact message transmit time and receive times and uses these times to calculate the communication path delay and clock offset. This delay measurement principle determines path delay between devices on the network and the local clocks are adjusted for this delay using the series of messages sent between masters 1 and slaves 3 (FIG. 1 and FIG. 2). The one-way delay time is calculated by averaging the path delay of the transmit and receive messages. This calculation assumes a symmetrical communication path over the network 2; however, packet networks do not necessarily have symmetrical communication paths, due to the buffering process in the network nodes (resulting in asymmetrical packet delay times). To address this, PTP provides a method, using transparent clock devices (implemented in switches and routers), to measure and account for the delay experienced by PTP messages in a time-interval field in the PTPmessages. This setup makes the switches and routers temporarily transparent (from a synchronization point) to the master 1 and slave 3 nodes on the network.

Transparent Clocks

The processing and buffering of packets 21 in network devices (switches, routers, etc.) introduce variations in the time latency of packets 21 traversing the packet network 2 as illustrated in FIG. 3 and FIG. 4. The variations in these delays means that the assumption that packet delay is the same in each direction is invalid, thus rendering the path delay calculations of PTP inaccurate. This issue can been addressed with the use of boundary clocks and transparent clocks.

A transparent clock (TC) does not act as a master or slave, but instead bridges these two and forwards PTP event messages and provides corrections for the residence time across the bridge. Residence time is the delay between the reception and transmission of a PTP message through a transparent clock device. These delays must be fully accounted for in the slave time offset correction. The role of transparent clocks in a PTP network is to determine certain path delay parameters and update a time-interval field (the correction field) that is part of the PTP event message header. This update allows the terminating clock to compensate for switch delays when synchronizing it clock to the master. There are two types of transparent clocks (End-to-End TCs and Peer-to-Peer TCs) but this work deals only with the E2E TC.

End-to-End (E2E) Transparent Clock

This is a multi-port device that is not a master or slave but a bridge between the two. This clock measures the message transit time (also known as resident time) in the device for (PTP event) Sync and Delay_Request messages as illustrated in FIG. 5. This measured transit time is added to the correction field in the corresponding messages:

The measured transit time of a Sync message is added to the correction field of the corresponding Sync or the Follow_Up message. In the one-step mode the residence time is added to the correction field of the Sync message; in the two-step mode the residence time is added to the correction field of the Follow_Up message.

The measured transit time of a Delay_Request message is added to the correction field of the corresponding Delay_Response message.

E2E TC devices 6 measure the delay the PTP packet resides in the TC device and increment the correction field in the PTP header as illustrated in FIG. 6. A PTP message arriving at the ingress port 61 is detected and timestamped by the local clock 62. The Correction Field of the arriving PTP message is read out. When the PTP message reaches the egress port 63 of the TC, an egress timestamp is produced by the local clock 62. The TC calculates the difference between the ingress timestamp and the egress timestamp as the residence time in the TC. The Correction Field is then updated by adding the residence time in the TC to the existing value of the Correction Field in the outgoing PTP message.

FIG. 7 shows the flow of PTP messages through an example network of E2E TC devices. The correction field ends up containing the sum of all the residence times that a Sync or Delay_Request message has encountered on its way through all E2E-TC network elements on the path. By doing so, the slave clock or boundary clock further down the line can determine how long the PTP packet resided in the TC devices before it. The slave clock can then use the residence times accumulated in the correction field to mitigate the effects of PDV. This information is used by the slave when determining the offset between the slave's and the master's time. E2E transparent clocks do not provide correction for the propagation delay of the link itself between devices; only P2P TCs support this.

A one-step E2E TC updates for switch delay in Sync and Delay-Req messages as they pass through the switch while a two-step TC updates a field in the non time-critical general message (Follow_Up and Delay_Resp).

The process in FIG. 7 continues hop by hop (where N is the number of hops or links), and the Follow-Up (two-step mode), Sync (one-step mode) or Delay_Req (delay request-response mechanism) messages maintain a running total of the residence times; resulting in a grand total delay value from master to slave. Upon receipt of the final message, the slave device calculates its offset using the total residence time which is accumulated in the correction field as follows:

$$\text{total\_residence\_time} = \sum_{i=1}^{N-1} r_i$$

The present invention aims to provide methods and devices which improve on the estimations of skew and offset of a slave clock where timing messages have passed through one or more transparent clocks on the path from the master to the slave.

SUMMARY OF THE INVENTION

An exemplary embodiment of the invention provides a method for estimating the skew and offset of a slave clock in a slave device in relation to a master clock in a master device, the slave device and the master device being connected by a network, the method including the steps of: exchanging timing messages between the master device and the slave device over the network, each timing message passing through at least one end-to-end transparent clock; recording timestamps which are the times of the sending and receiving said messages according to the respective clocks; recording the residence time of each message passing through the or each transparent clock; estimating the skew and offset of the slave clock using the said timestamps and said residence times.

A further exemplary embodiment of the invention provides a slave device connected to a master device having a master clock by a network containing at least one end-to-end transparent clock, the slave device having a slave clock and a processor, the slave device being arranged to: exchange timing messages with the master device over said network and record timestamps which are the times of sending and receiving said messages according to the respective clocks; and extract from said messages the residence time of each message passing through the or each transparent clock, wherein: the processor is arranged to: estimate the skew and offset of the slave clock compared to the master clock using said timestamps and said residence times.

A further exemplary embodiment of the invention provides a system including: a master device having a master clock; a slave device having a slave clock and a processor; and a network connecting said master device and said slave device and having at least one end-to-end transparent clock, wherein the slave device is arranged to: exchange timing messages with the master device over said network and record timestamps which are the times of sending and receiving said messages according to the respective clocks; the or each transparent clock is arranged to: record the residence time of each message passing through the transparent clock, and further wherein: the processor is arranged to: estimate the skew and offset of the slave clock compared to the master clock using said timestamps and said residence times.

BRIEF DESCRIPTION OF THE DRAWINGS

Embodiments of the invention will now be described by way of example with reference to the accompanying drawings in which.

DETAILED DESCRIPTION

Figure 1:
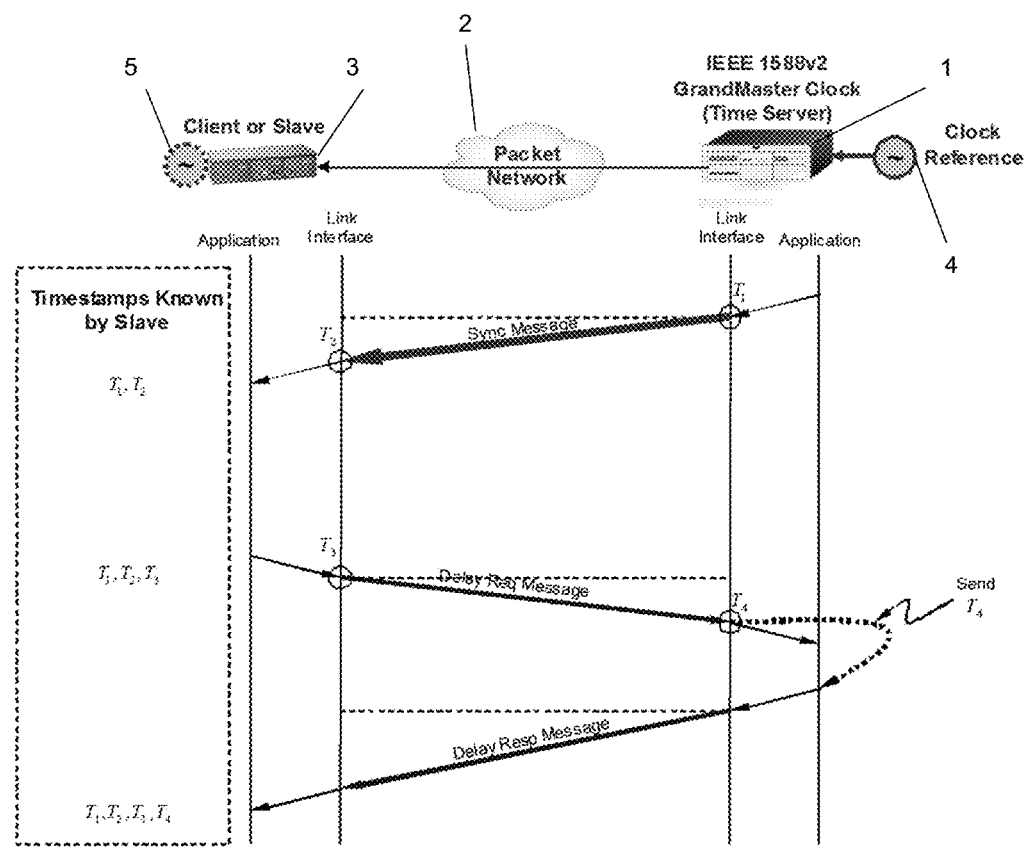
FIG. 1 shows an overview of the one-step clock message flow under IEEE 1588 PTP and has already been described.

At their broadest, aspects of the present invention provide for methods and devices for estimating skew and offset in a slave device where timing messages from the master device have passed through at least one transparent clock, which make use of the residence time(s) recorded by the or each transparent clock.

A first aspect of the present invention provides a method for estimating the skew and offset of a slave clock in a slave device in relation to a master clock in a master device, the slave device and the master device being connected by a network, the method including the steps of: exchanging timing messages between the master device and the slave device over the network, each timing message passing through at least one end-to-end transparent clock; recording timestamps which are the times of the sending and receiving said messages according to the respective clocks; recording the residence time of each message passing through the or each transparent clock; estimating the skew and offset of the slave clock using the said timestamps and said residence times.

This method can improve time distribution accuracy by allowing slave devices to compensate for the message delivery variability across the network by using the recorded residence time(s) when estimating the skew and offset.

End-to-end transparent clocks may not synchronize their own clocks to the master clock and so may contain inaccuracies in their calculation of the residence times. However, the estimated skew and offset of the slave clock can still be improved.

The method may further include the step of synchronizing the output of the slave clock to the master clock using said estimated offset and skew. By using residence time measurements by the transparent clocks, very accurate clock synchronization may be achieved, possibly to levels comparable to GPS.

In certain embodiments, the step of estimating the skew and offset uses an exponentially weighted moving average filter applied to said timestamps and said residence times.

For example, the step of estimating the skew and offset may estimate the skew $\alpha$ as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1}) + (r_{ftotal,n} - r_{ftotal,n-1})}{(T_{2,n} - T_{2,n-1})} - 1$$

&

$$\alpha_2 = \frac{(T_{4,n} - T_{4,n-1}) - (r_{rtotal,n} - r_{rtotal,n-1})}{(T_{3,n} - T_{3,n-1})} - 1,$$

wherein: $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock; and $r_{ftotal,n}$ and $r_{rtotal,n}$ are the residence times of the nth packet in the forward and reverse directions respectively, estimate the offset $\theta$ as $$\theta = \frac{(T_{1,n} + T_{4,n}) - (1+\alpha)(T_{2,n} + T_{3,n})}{2} + \frac{(d_f - d_r)}{2} + \frac{(r_{ftotal,n} - r_{rtotal,n})}{2},$$

wherein: $d_f$ is the fixed physical link delay in the forward direction; and $d_r$ is the fixed physical link delay in the reverse direction, and updates the offset and skew according to the update equations:

$\hat{\alpha}_n = \mu\alpha_n + (1-\mu)\hat{\alpha}_{n-1}$, $0<\mu<1$ and $\hat{\theta}_n = \mu\theta_n + (1-\mu)\hat{\theta}_{n-1}$, $0<\mu<1$.

The exponentially weighted moving average filter is a simple linear approximation technique which allows account to be taken of previous measurements when calculating the measurement of a quantity for the current time frame. By adjusting the parameter $\mu$, the influence of previous calculations can be reduced or increased accordingly. For small values of $\mu$, the offset and skew are dominated by the measurements at the current time. For larger values of $\mu$, the offset and skew take greater account of previous values, which can smooth the running calculation of these values and reduce the effect of spikes in the instantaneous calculations.

In other embodiments, the step of estimating the skew and offset uses a Kalman filter. For example, to estimate the skew $\alpha_n$ and the offset $\theta_n$ at time n, the Kalman filter may be applied to: the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and to the measurement equation $$y_n = D_n X_n + v_n,$$

wherein:
$y_n = (T_{1,n} - T_{2,n}) + (T_{4,n} - T_{3,n}) + (d_f - d_r) + (r_{ftotal,n} - r_{rtotal,n})$ is a scalar, $D_n = [2(T_{2,n} + T_{3,n})]$ is a 1×2 matrix, $X_n^T = [\theta_n \alpha_n]$ is a vector and $v_n = (\gamma_n - \epsilon_n)$ is the measurement noise, and wherein: $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock; $r_{ftotal,n}$ and $r_{rtotal,n}$ are the residence times of the nth packet in the forward and reverse directions respectively, $d_f$ is the fixed physical link delay in the forward direction; and $d_r$ is the fixed physical link delay in the reverse direction, $\epsilon$ is the stochastic delay in the transmission of messages between the master and the slave device; and $\gamma$ is the stochastic delay in the transmission of messages between the slave and the master device.

The Kalman filter allows measurements of a process observed over time, containing noise and other inaccuracies, to be used to produce values (estimates) that tend to be closer to the true values of the measurements and their associated calculated values.

The method of the present aspect may include any combination of some, all or none of the above described preferred and optional features.

The method of the above aspect is preferably implemented by a slave device or a system according to the second or third aspects of this invention, as described below, but need not be.

Further aspects of the present invention include computer programs for running on computer systems which carry out the method of the above aspect, including some, all or none of the preferred and optional features of that aspect.

A second aspect of the present invention provides a slave device connected to a master device having a master clock by a network containing at least one end-to-end transparent clock, the slave device having a slave clock and a processor, the slave device being arranged to: exchange timing messages with the master device over said network and record timestamps which are the times of sending and receiving said messages according to the respective clocks; and extract from said messages the residence time of each message passing through the or each transparent clock, wherein: the processor is arranged to: estimate the skew and offset of the slave clock compared to the master clock using said timestamps and said residence times.

The slave device of this aspect can have improved time distribution accuracy by being able to compensate for the message delivery variability across the network by using the recorded residence time(s) when estimating the skew and offset.

The processor may be further arranged to synchronize the output of the slave clock to the master clock using said estimated offset and skew. By using residence time measurements by the transparent clocks, very accurate clock synchronization may be achieved, possibly to levels comparable to GPS.

In certain embodiments, the processor estimates the skew and offset using an exponentially weighted moving average filter applied to said timestamps and said residence times.

For example the processor may estimate the skew $\alpha$ as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1}) + (r_{ftotal,n} - r_{ftotal,n-1})}{(T_{2,n} - T_{2,n-1})} - 1$$

&

$$\alpha_2 = \frac{(T_{4,n} - T_{4,n-1}) - (r_{rtotal,n} - r_{rtotal,n-1})}{(T_{3,n} - T_{3,n-1})} - 1,$$

wherein $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock; and $r_{ftotal,n}$ and $r_{rtotal,n}$ are the residence times of the nth packet in the forward and reverse directions respectively, estimates the offset $\theta$ as $$\theta = \frac{(T_{1,n} + T_{4,n}) - (1 + \alpha)(T_{2,n} + T_{3,n})}{2} + \frac{(d_f - d_r)}{2} + \frac{(r_{ftotal,n} - r_{rtotal,n})}{2},$$

wherein: $d_f$ is the fixed physical link delay in the forward direction; and $d_r$ is the fixed physical link delay in the reverse direction, and updates the offset and skew according to the update equations: $\hat{\alpha}_n = \mu \alpha_n + (1-\mu)\hat{\alpha}_{n-1}$, $0 < \mu < 1$ and $\hat{\theta}_n = \mu \theta_n + (1-\mu)\hat{\theta}_{n-1}, 0 < \mu < 1$.

The exponentially weighted moving average filter is a simple linear approximation technique which allows account to be taken of previous measurements when calculating the measurement of a quantity for the current time frame. By adjusting the parameter $\mu$, the influence of previous calculations can be reduced or increased accordingly. For small values of $\mu$, the offset and skew are dominated by the measurements at the current time. For larger values of $\mu$, the offset and skew take greater account of previous values, which can smooth the running calculation of these values and reduce the effect of spikes in the instantaneous calculations.

In other embodiments, the processor estimates the skew and offset using a Kalman filter. For example to estimate the skew $\alpha_n$ and the offset $\theta_n$ at time n, the Kalman filter may be applied to: the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and to the measurement equation $$y_n = D_n X_n + v_n$$

wherein:
$y_n = (T_{1,n} - T_{2,n}) + (T_{4,n} - T_{3,n}) + (d_f - d_r) + (r_{ftotal,n} - r_{rtotal,n})$ is a scalar, $D_n = [2(T_{2,n} + T_{3,n})]$ is a 1×2 matrix, $X_n^T = [\theta_n\ \alpha_n]$ is a vector and $v_n = (\gamma_n - \epsilon_n)$ is the measurement noise, and wherein: $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock; $r_{ftotal,n}$ and $r_{rtotal,n}$ are the residence times of the nth packet in the forward and reverse directions respectively, $d_f$ is the fixed physical link delay in the forward direction; and $d_r$ is the fixed physical link delay in the reverse direction, $\epsilon$ is the stochastic delay in the transmission of messages between the master and the slave device; and $\gamma$ is the stochastic delay in the transmission of messages between the slave and the master device.

The Kalman filter allows measurements of a process observed over time, containing noise and other inaccuracies, to be used to produce values (estimates) that tend to be closer to the true values of the measurements and their associated calculated values.

The slave device of the present aspect may include any combination of some, all or none of the above described preferred and optional features.

A third aspect of the present invention provides a system including: a master device having a master clock; a slave device having a slave clock and a processor; and a network connecting said master device and said slave device and having at least one end-to-end transparent clock, wherein the slave device is arranged to: exchange timing messages with the master device over said network and record timestamps which are the times of sending and receiving said messages according to the respective clocks; the or each transparent clock is arranged to: record the residence time of each message passing through the transparent clock, and further wherein: the processor is arranged to: estimate the skew and offset of the slave clock compared to the master clock using said timestamps and said residence times.

The system of this aspect can have improved time distribution accuracy by allowing slave devices to compensate for the message delivery variability across the network by using the recorded residence time(s) when estimating the skew and offset.

The transparent clock(s) may be end-to-end transparent clocks. End-to-end transparent clocks may not synchronize their own clocks to the master clock and so may contain inaccuracies in their calculation of the residence times. However, the estimated skew and offset of the slave clock can still be improved.

The processor may be further arranged to synchronize the output of the slave clock to the master clock using said estimated offset and skew. By using residence time measurements by the transparent clocks, very accurate clock synchronization may be achieved, possibly to levels comparable to GPS.

In certain embodiments, the processor estimates the skew and offset using an exponentially weighted moving average filter applied to said timestamps and said residence times.

For example, the processor may estimate the skew $\alpha$ as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1}) + (r_{ftotal,n} - r_{ftotal,n-1})}{(T_{2,n} - T_{2,n-1})} - 1$$

&

$$\alpha_2 = \frac{(T_{4,n} - T_{4,n-1}) - (r_{rtotal,n} - r_{rtotal,n-1})}{(T_{3,n} - T_{3,n-1})} - 1,$$

wherein $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock; and $r_{ftotal,n}$ and $r_{rtotal,n}$ are the residence times of the nth packet in the forward and reverse directions respectively, estimates the offset $\theta$ as $$\theta = \frac{(T_{1,n} + T_{4,n}) - (1+\alpha)(T_{2,n} + T_{3,n})}{2} + \frac{(d_f - d_r)}{2} + \frac{(r_{ftotal,n} - r_{rtotal,n})}{2},$$

wherein: $d_f$ is the fixed physical link delay in the forward direction; and $d_r$ is the fixed physical link delay in the reverse direction, and updates the offset and skew according to the update equations:

$$\hat{\alpha}_n = \mu \alpha_n + (1-\mu)\hat{\alpha}_{n-1}, 0 < \mu < 1 \text{ and } \hat{\theta}_n = \mu \theta_n + (1-\mu)\hat{\theta}_{n-1}, 0 < \mu < 1.$$

The exponentially weighted moving average filter is a simple linear approximation technique which allows account to be taken of previous measurements when calculating the measurement of a quantity for the current time frame. By adjusting the parameter $\mu$, the influence of previous calculations can be reduced or increased accordingly. For small values of $\mu$, the offset and skew are dominated by the measurements at the current time. For larger values of $\mu$, the offset and skew take greater account of previous values, which can smooth the running calculation of these values and reduce the effect of spikes in the instantaneous calculations.

In other embodiments, the processor estimates the skew and offset using a Kalman filter. For example, to estimate the skew $\alpha_n$ and the offset $\theta_n$ at time n, the Kalman filter may be applied to: the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and to the measurement equation $$y_n = D_n X_n + v_n$$

wherein:
$y_n = (T_{1,n} - T_{2,n}) + (T_{4,n} - T_{3,n}) + (d_f - d_r) + (r_{ftotal,n} - r_{rtotal,n})$ is a scalar, $D_n = [2(T_{2,n} + T_{3,n})]$ is a 1×2 matrix, $X_n^T = [\theta_n\ \alpha_n]$ is a vector and $v_n = (\gamma_n - \epsilon_n)$ is the measurement noise, and wherein: $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock; $r_{ftotal,n}$ and $r_{rtotal,n}$ are the residence times of the nth packet in the forward and reverse directions respectively, $d_f$ is the fixed physical link delay in the forward direction; and $d_r$ is the fixed physical link delay in the reverse direction, $\epsilon$ is the stochastic delay in the transmission of messages between the master and the slave device; and $\gamma$ is the stochastic delay in the transmission of messages between the slave and the master device.

The Kalman filter allows measurements of a process observed over time, containing noise and other inaccuracies, to be used to produce values (estimates) that tend to be closer to the true values of the measurements and their associated calculated values.

The system of the present aspect may include any combination of some, all or none of the above described preferred and optional features.

Figure 8:
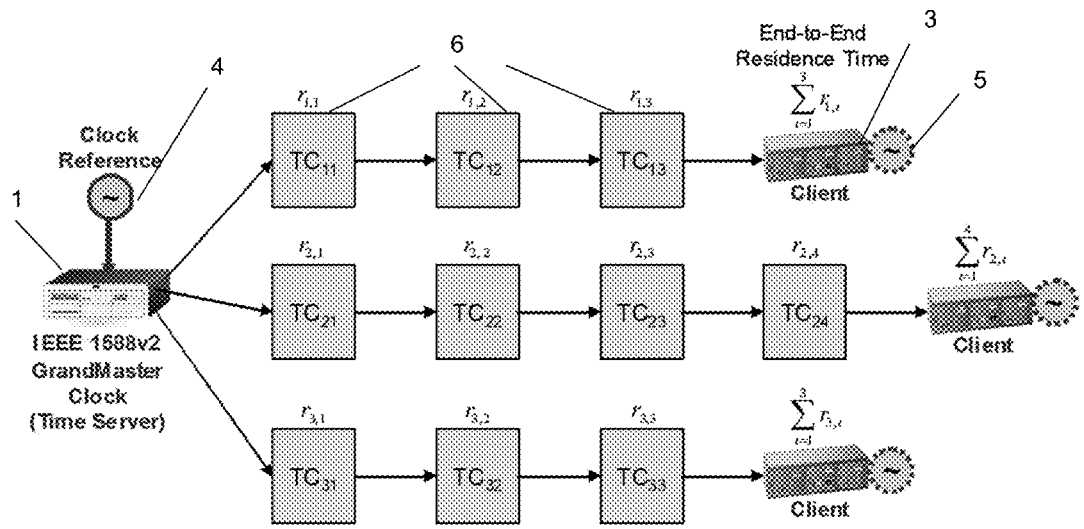
FIG. 8 shows a time distribution scheme using transparent clocks according to an embodiment of the present invention.
Figure 6:
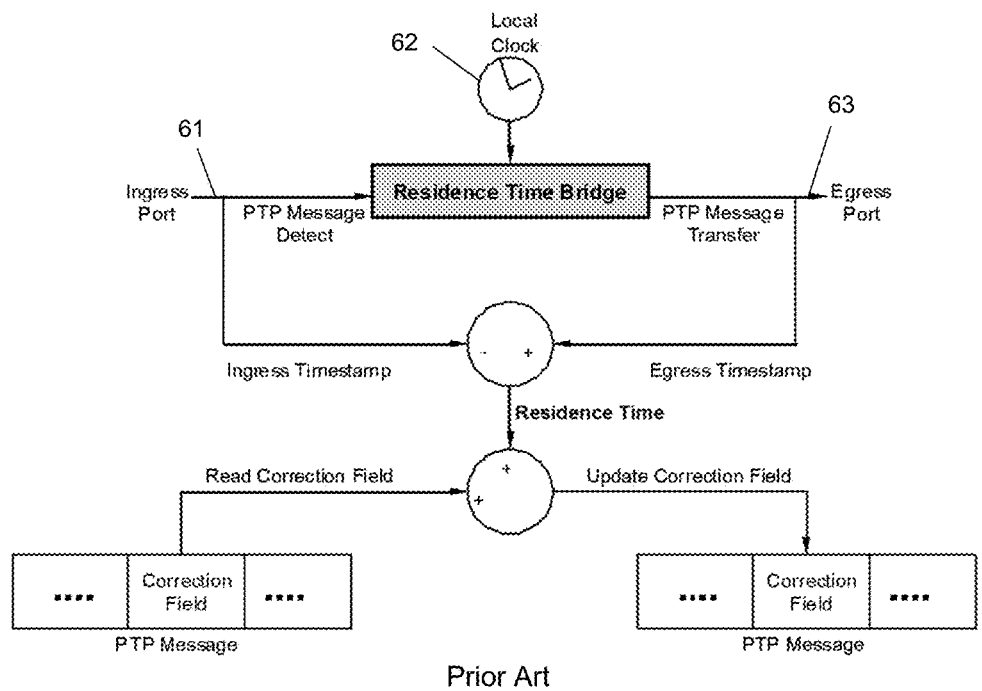
FIG. 6 shows how an End-to-End transparent clock updates the correction field and has already been described.

FIG. 8 shows a system according to an embodiment of the present invention in which the transparent clock devices on the communication path to each slave measure the delay the PTP packet resides in the TC device and increment the correction field in the PTP header. By doing so, the slave clock or boundary clock further down the line can determine how long the PTP packet resided in the TC devices before it. The slave can then use the values in the correction field to compensate for the effects PDV on its path when synchronizing it clock to the master.

Figure 9:
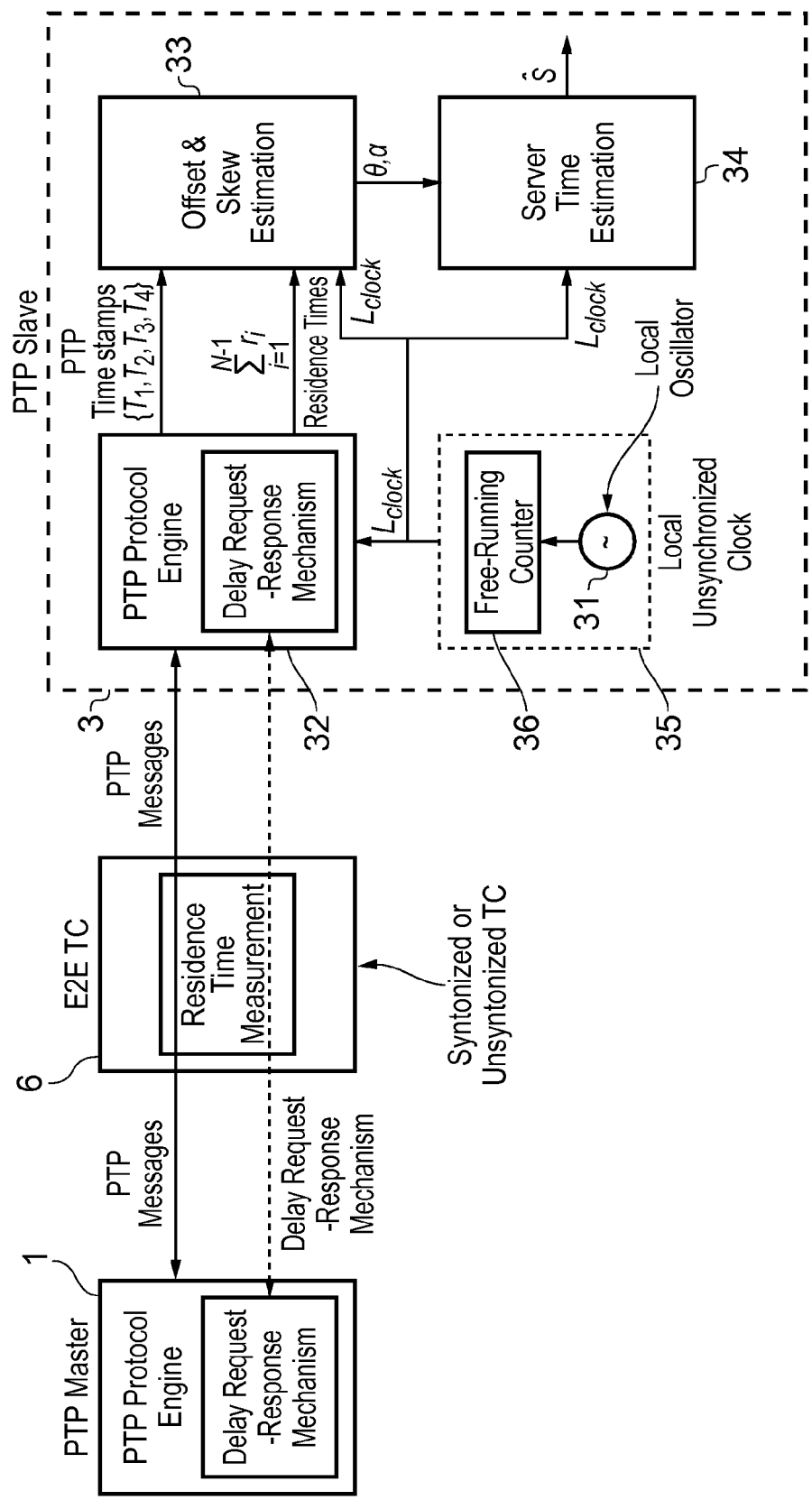
FIG. 9 shows the processing of timing messages in a system and slave device according to embodiments of the present invention.

FIG. 9 shows the main blocks of a synchronization technique according to an embodiment of the present invention as carried out at a PTP slave 3 which is a slave device according to a further embodiment of the present invention. A free running local oscillator 31 is used together with the estimated clock parameters to synthesize a synchronized local clock which is an estimated image of the server clock 4. The frequency of this client's local oscillator 31 is not adjusted, but it is allowed to free-run. This free running counter is used for timestamping and for synthesizing an image of the server clock (synchronized local clock) for the time client. The timestamps indicated in FIG. 9 at the client are with respect to this local clock.

As shown in FIG. 9, PTP messages are exchanged between the PTP master 1 and the PTP slave 3, passing through one or more End-to-End transparent clocks 6 on the network.

The slave has a local free-running clock 35 made up of a local oscillator 31 and a free-running counter 36. The timing signal from the clock 35 is provided to each of a PTP protocol engine 32, an offset and skew estimation unit 33 and a server time estimation unit or synchronizer 34.

The PTP protocol engine 32 receives and handles the PTP message exchange between the slave 3 and the master 1, including timestamping incoming PTP messages, extracting timestamps from said messages and passing said timestamps to the offset and skew estimation unit 33. The PTP protocol engine 32 may operate under either the one-step or two-step PTP protocol.

The offset and skew estimation unit 33 receives PTP timestamps from the PTP protocol engine 32. Based on this information, the offset and skew estimation unit calculates a current estimation of the offset and skew of the slave clock 35 compared to the clock in the PTP master 1. Various methods for performing this calculation are set out the embodiments of the present invention.

Figure 12:
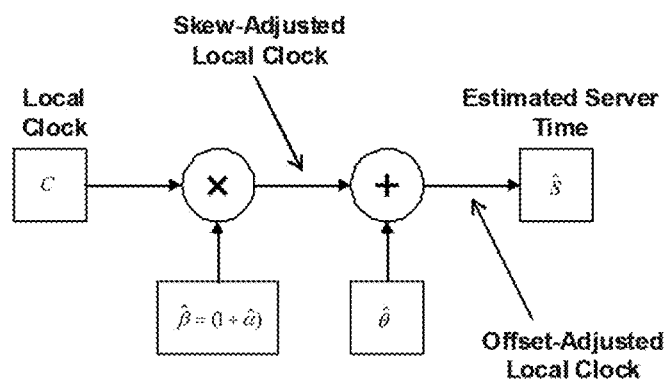
FIG. 12 shows the steps for estimating the server time from the local clock in a slave device according to an embodiment of the present invention.
Figure 7:
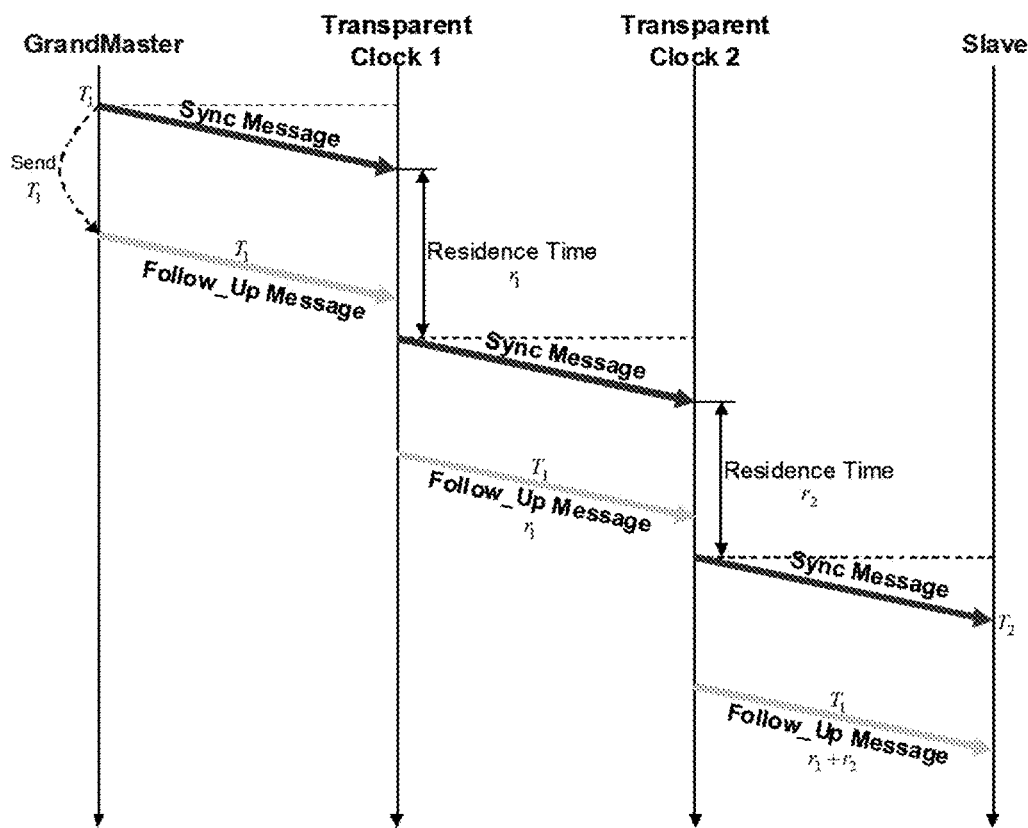
FIG. 7 shows the PTP message flow through transparent clocks and has already been described.

The server time estimation unit 34 uses the offset and skew estimated by the offset and skew estimation unit 33 to update the output of the slave clock 35 and provides this estimate of the master time to other functions in the slave device 3. The calculations performed by the server time estimation unit 34 are illustrated in FIG. 12.

Basic Clock Model

Figure 10:
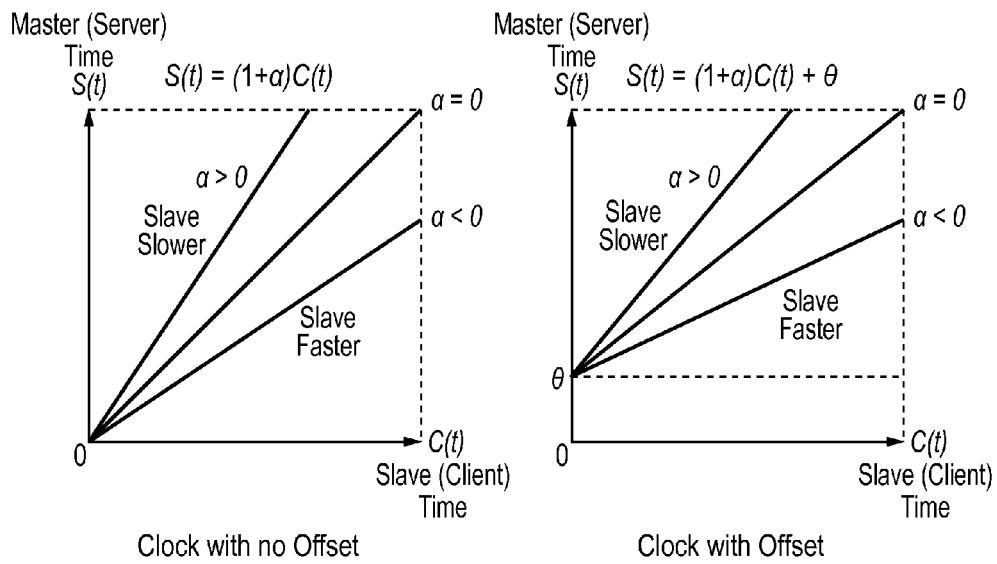
FIG. 10 illustrates the clock model used to set out methods according to embodiments of the present invention.

First we define a generalized clock offset and skew equation for the synchronization problem. It is assumed that at any particular time instant, the instantaneous view of the relationship between the master (server) clock with timeline S(t) and the slave (client) clock with timeline C(t), can be described by the well-known simple skew clock model depicted in FIG. 10, and described by the equation, $$S(t)=(1+\alpha)C(t)+\theta, \qquad (1)$$

where $\theta$ is the time offset and a is the skew (frequency offset) which is a very small quantity in the order of parts-per-million. This snapshot is an instantaneous view of how well the two clocks are (mis)aligned. FIG. 10 illustrates the influence of $\theta$ and $\alpha$ on the alignment.

Figure 11:
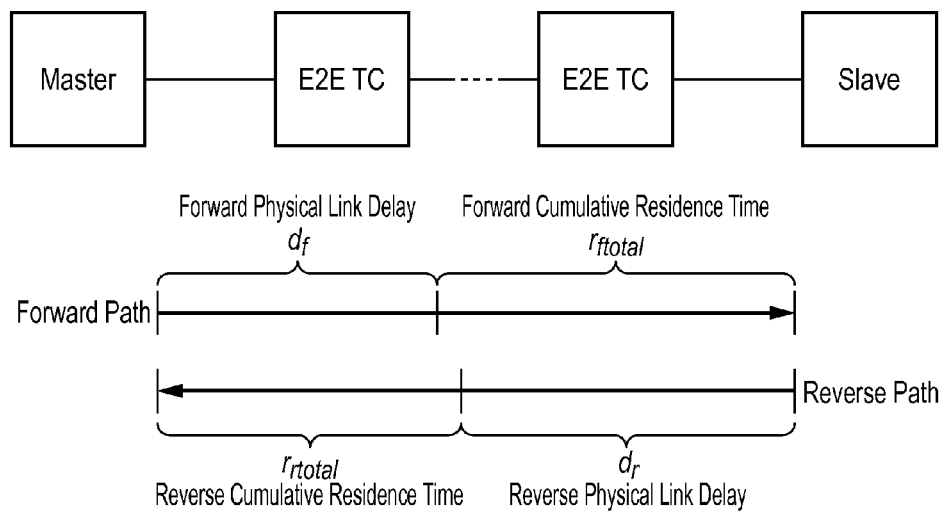
FIG. 11 shows the effects of path delays in a system according to an embodiment of the present invention.

The above equation can be extended to account for the case where the master clock and slave clock exchange PTP messages over a communication link with delay and with the messages passing through a network of E2E TCs. It is assumed that the nth Sync message travels from a master to a slave experiences a fixed physical link (or propagation) delay of $d_f$ plus variable cumulative residence time of $r_{ftotal,n}$ as shown in FIG. 11. Similarly, it is assumed that the nth Delay_Req message sent from the slave to the master experiences a fixed delay of $d_r$ plus variable cumulative residence time of $r_{rtotal,n}$.

Figure 2:
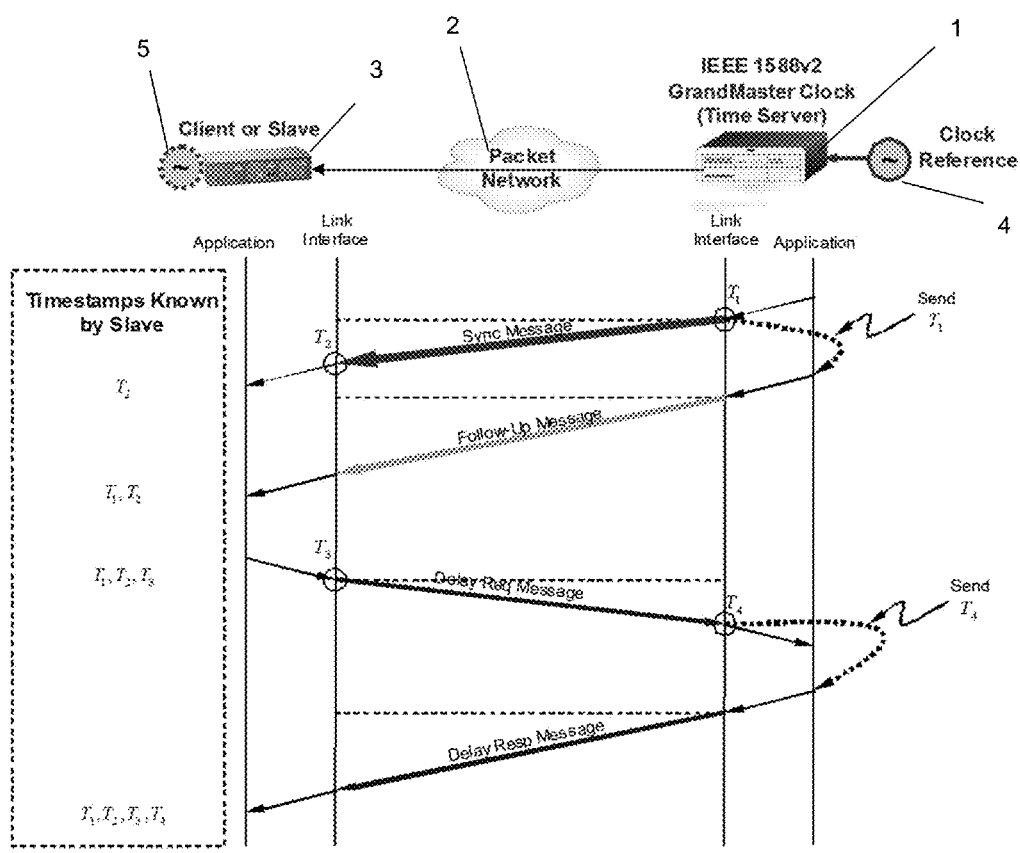
FIG. 2 shows an overview of the two-step clock message flow under IEEE 1588 PTP and has already been described.
Figure 3:
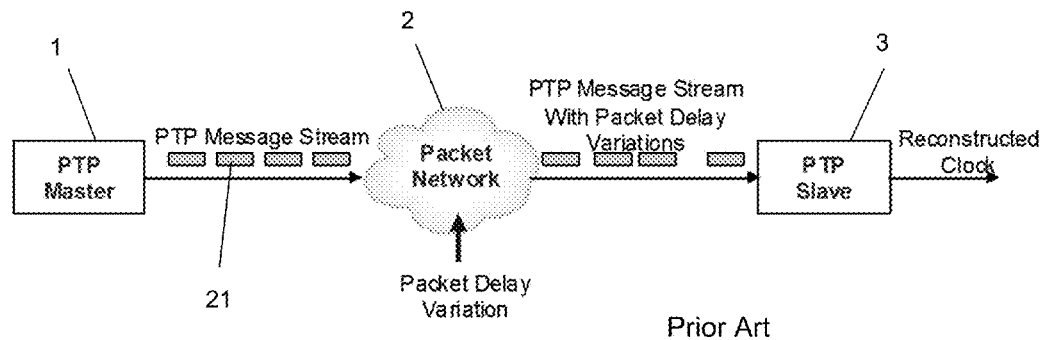
FIG. 3 illustrates how a packet network can cause packet delay variation and has already been described.
Figure 4:
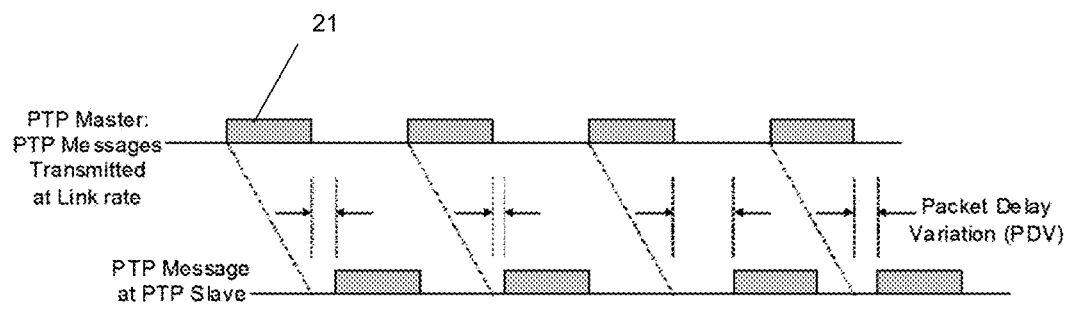
FIG. 4 illustrates the effects of packet delay variation on a generated PTP message stream and has already been described.
Figure 5:
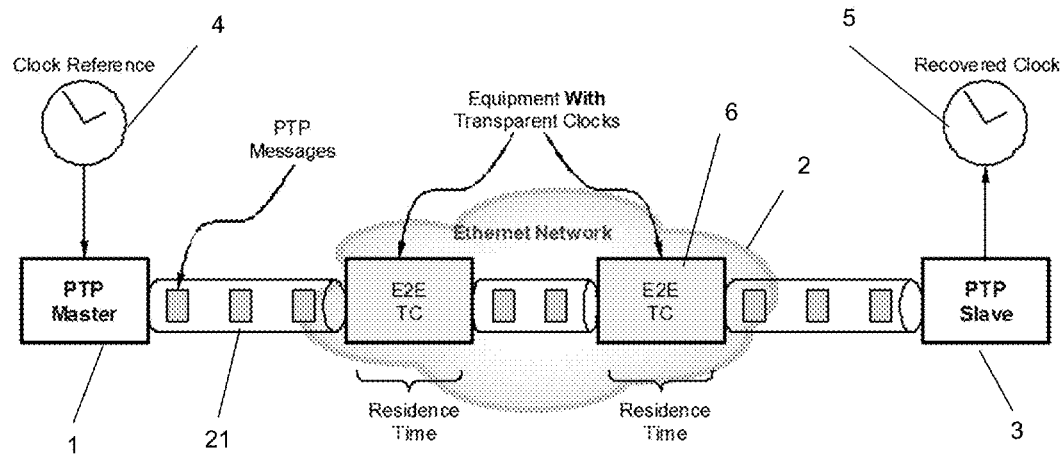
FIG. 5 shows the general principles of clock transfer using End-to-End transparent clocks and has already been described.

The master and slave exchange messages using the delay-request delay-response mechanism described above with respect to FIG. 1 and FIG. 2. For the nth Sync message which departs the master with timestamp $T_{1,n} \in S(t)$ and arrives at the slave with timestamp $T_{2,n} \in C(t)$ after having experienced delays of $d_f$ and $r_{ftotal,n}$, the simple skew clock model above can be extended to account for the travel time to obtain the following expression $$(T_{1,n}+d_f+r_{ftotal,n})=(1+\alpha)T_{2,n}+\theta \qquad (2)$$

For the nth Delay_Req message which departs the slave with timestamp $T_{3,n} \in C(t)$ and arrives at the master with timestamp $T_{4,n} \in S(t)$ after having experienced delays of $d_r$ and $r_{rtotal,n}$ we obtain the following expression $$(T_{4,n}-d_r-r_{rtotal,n})=(1+\alpha)T_{3,n}+\theta \qquad (3)$$

A key assumption here is that the message exchanges occur over a period of time so small that the offset $\theta$ can be assumed constant over that period. Below are set out methods according to two embodiments of the present invention for computing the offset $\theta$ and skew $\alpha$ using the Sync and Delay_Req message exchanges.

Simple Linear Approximation Technique for Offset and Skew Estimation Using E2E TCs Adding equations (2) and (3) and rearranging gives the overall clock offset $\theta$ as $$\theta = \frac{(T_{1,n}+T_{4,n})-(1+\alpha)(T_{2,n}+T_{3,n})+}{2} \qquad (4)$$
$$\frac{(d_f-d_r)+(r_{ftotal,n}-r_{rtotal,n})}{2}$$
$$= \frac{(T_{1,n}+T_{4,n})-(1+\alpha)(T_{2,n}+T_{3,n})}{2} + \frac{(d_f-d_r)}{2} +$$
$$\frac{(r_{ftotal,n}-r_{rtotal,n})}{2}$$
$$= \theta_{raw}+\theta_{prop}+\theta_{res}$$

where, $\theta_{raw} = [(T_{1,n}+T_{4,n})-(1+\alpha)(T_{2,n}+T_{3,n})]/2$ is the raw offset or true offset in the absence of any asymmetries in the system, $\theta_{prop} = (d_f - d_r)/2$ is the offset compensation due to asymmetry in the physical link (or propagation) delay, and $\theta_{res} = (r_{ftotal,n} - r_{rtotal,n})/2$ is the offset compensation due to asymmetry in the cumulative residence times.

The raw offset $\theta_{raw}$ is the simplest quantity often computed during clock synchronization because the system is assumed to be symmetric in the average sense (the average delay in both directions on the path are assumed to be equal). An asymmetric path exists when the fixed delay components and/or residence time components in both directions are unequal. It is assumed that the physical link asymmetry is manually calibrated and compensated for but the asymmetry due to unequal residence times is compensated for using the E2E TCs.

The offset $\theta_{prop}$ can be determined as described in ITU-T Rec G.8271 [1] and added to the raw offset $\theta_{raw}$. For perfectly symmetric links, $\theta_{prop}=0$. The E2E TCs provide a means of measuring $r_{ftotal,n}$ and $r_{rtotal,n}$ from which offset $\theta_{res}$ can be calculated. In the absence of the TCs (i.e., in the end-to-end time transfer case without network timing support), the offset $\theta_{res}$ is often ignored by assuming that the average delays in both directions on the path are equal. No such assumption is required since the E2E TCs allow us to compute $\theta_{res}$ accurately.

Next we describe now how the skew can be estimated using the Sync and Delay_Req messages. Let $\alpha_1$ denote the component of the skew that can be estimated from the Sync message exchange. For the (n−1) and nth Sync message exchange equation (2) provides the following $$(T_{1,n-1}+d_f+r_{ftotal,n-1})=(1+\alpha_2)T_{2,n-1}+\theta \qquad (5)$$

$$(T_{1,n}-d_f-r_{ftotal,n})=(1+\alpha_1)T_{2,n}+\theta \qquad (6)$$

Subtracting (5) from (6), gives $$(T_{1,n}-T_{1,n-1}) + (r_{ftotal,n}-r_{ftotal,n-1}) = (1+\alpha_1)(T_{2,n}-T_{2,n-1}) \qquad (7)$$

$$\alpha_1 = \frac{(T_{1,n}-T_{1,n-1}) + (r_{ftotal,n}-r_{ftotal,n-1})}{(T_{2,n}-T_{2,n-1})} - 1 \qquad (8)$$

Let $\alpha_2$ denote the component of the skew that can be estimated from the Delay_Req message exchange. For the (n−1) and nth Delay_Req message exchange equation (3) provides the following $$(T_{4,n-1}-d_r-r_{rtotal,n-1})=(1+\alpha_2)T_{3,n-1}+\theta \qquad (9)$$

$$(T_{4,n}-d_r-r_{rtotal,n})=(1+\alpha_2)T_{3,n}+\theta \qquad (10)$$

Subtracting (9) from (10), gives $$(T_{4,n}-T_{4,n-1}) - (r_{rtotal,n}-r_{rtotal,n-1}) = (1+\alpha_2)(T_{3,n}-T_{3,n-1}) \qquad (11)$$

$$\alpha_2 = \frac{(T_{4,n}-T_{4,n-1}) - (r_{rtotal,n}-r_{rtotal,n-1})}{(T_{3,n}-T_{3,n-1})} - 1 \qquad (12)$$

The skew $\alpha$ can then be estimated from $\alpha_1$ and $\alpha_2$ as $$\alpha = \frac{\alpha_1 + \alpha_2}{2} \qquad (13)$$

The estimated skew $\alpha$ is then used to compute the clock offset $\theta$ as given in (4). To compute the server time estimate $(\hat{S})$, filtered values of the clock offset $(\hat{\theta})$ and skew $(\hat{\alpha})$ preferably should be used. The filtering can be done using a simple exponentially weighted moving average (EWMA) filter $$\hat{\alpha}_n = \mu\alpha_n + (1-\mu)\hat{\alpha}_{n-1}, 0<\mu<1 \qquad (14)$$

$$\hat{\theta}_n = \mu\theta_n + (1-\mu)\hat{\theta}_{n-1}, 0<\mu<1 \qquad (15)$$

$$\hat{S}_n = (1+\hat{\alpha}_n)C_n + \hat{\theta}_n \qquad (16)$$

We denote $C_n$ as the current reading of the slave's local free-running clock.

Kalman Filter Based Technique for Offset and Skew Estimation Using E2E TCs

This section sets out models which can be used with a Kalman filter based technique to estimate the clock offset and skew. The Kalman filter [2] allows the use of measurements of a process observed over time, containing noise and other inaccuracies, to produce values (estimates) that tend to be closer to the true values of the measurements and their associated calculated values. The Kalman filter produces estimates of the true values of measurements and their associated calculated values by predicting a value, estimating the uncertainty of the predicted value, and computing a weighted average of the predicted value and the measured value.

In order to use the Kalman filter (to estimate the internal state of a process given only a sequence of noisy observations), the process must be modelled in accordance with the framework of the Kalman filter. Consider a state-space model described by the following pair of equations $$\text{State Equation: } X_n = A_n X_{n-1} + w_n, \qquad (17)$$

$$\text{Measurement Equation: } y_n = D_n X_n + v_n, \qquad (18)$$

where n is a nonnegative time index, $A_n$ is a known M-by-M state transition matrix, $X_n$ is the M-dimensional state (or parameter) vector, $w_n$ is an M-dimensional process noise vector which is assumed to be drawn from a zero mean multivariate normal distribution with covariance $Q_n = E[w_n w_n^T]$, $w_n \sim N(0,Q_n)$, $y_n$ is the measurement, $D_n$ is a known 1×M-dimensional measurement matrix which maps the true state space into the measurement space, $v_n$ is the measurement noise which is assumed to be zero mean Gaussian white noise with covariance $R_n = E[v_n v_n^T]$, $v_n \sim N(0,R_n)$, and T denotes transpose. It is assumed in the model that the initial state, and the noise vectors at each step $\{X_0, w_1, \ldots, w_n, v_1, \ldots, v_n\}$ are mutually independent.

The notation $\hat{X}_{n,m}$ used below represents the estimate of X at time n given observations up to, and including at time m. The Kalman filter equations is most often conceptualized as two distinct phases: Predict and Update as described below.

Predict Phase:

The predict phase uses the state estimate from the previous timestep to produce an estimate of the state at the current timestep.

Predicted (a priori) state estimate:

$$\hat{X}_{n,n-1} = A_n \hat{X}_{n-1,n-1} \qquad (19)$$

This predicted state estimate is also known as the a priori state estimate because, although it is an estimate of the state at the current timestep, it does not include observation information from the current timestep.

Predicted (a priori) estimate covariance:

$$P_{n,n-1} = A_n P_{n-1,n-1} A_n^T Q_n \quad (20)$$

Update Phase:

In the update phase, the current a priori prediction is combined with current observation information to refine the state estimate. This improved estimate is termed the a posteriori state estimate.

Innovation or measurement residual:

$$\tilde{z}_n = y_n - D_n \hat{X}_{n,n-1} \quad (21)$$

Innovation (or residual) covariance:

$$S_n = D_n P_{n,n-1} D_n^T + R_n \quad (22)$$

Optimal Kalman gain:

$$K_n = P_{n,n-1} D_n^T S_n^{-1} = P_{n,n-1} D_n^T [D_n P_{n,n-1} D_n^T + R_n]^{-1} \quad (23)$$

Updated (a posteriori) state estimate:

$$\hat{X}_{n,n} = \hat{X}_{n,n-1} + K_n \tilde{z}_n = \hat{X}_{n,n-1} + K_n(y_n - D_n \hat{X}_{n,n-1}) \quad (24)$$

This is the a posteriori state estimate at time n given observations up to and including at time n. The second term in the above equation is called the correction term and it represents the amount by which to correct the propagated state estimate due to our measurement. Inspection of the Kalman gain equation shows that if the measurement noise is large, $R_n$ will be large, so that $K_n$ will be small and we would not give much credibility to the measurement y when computing the next $\hat{X}$. On the other hand, if the measurement noise is small, $R_n$ will be small, so that $K_n$ will be large and we will give a lot of credibility to the measurement when computing the next $\hat{X}$.

Updated (a posteriori) estimate covariance:

$$P_{n,n} = (I - K_n D_n) P_{n,n-1} \quad (25)$$

This is the a posteriori error covariance matrix (a measure of the estimated accuracy of the state estimate).

Typically, the two phases alternate, with the prediction advancing the state until the next scheduled observation, and the update incorporating the observation. Practical implementation of the Kalman Filter requires getting a good estimate of the noise covariance matrices $Q_n$ and $R_n$.

Development of the Measurement Equation

It is assumed that a Sync message which travels from a master to a slave through a network of E2E TCs experiences a fixed delay d, variable cumulative residence time $r_{ftotal}$, plus a stochastic delay $\epsilon$ (to account for all other delay components in the system). Similarly, we assume a Delay_Req message sent from the slave to the master experiences a fixed delay of d, variable cumulative residence time $r_{rtotal}$, and a variable stochastic delay $\gamma$. It is further assumed that the fixed delay components in both directions are equal, $d_f = d_r = d$ (symmetric communication paths) but the messages experience variables delays such queuing delays. The variables $\theta_n$ and $\alpha_n$ are the offset and skew during the nth Sync message exchange. Equations (2) and (3) above can be rewritten to account for the above conditions with the following equations:

$$(T_{1,n} + d + r_{ftotal,n} + \epsilon_n) = (1 + \alpha_n) T_{2,n} + \theta_n \quad (26)$$

$$(T_{4,n} - d - r_{rtotal,n} + \gamma_n) = (1 + \alpha_n) T_{3,n} + \theta_n \quad (27)$$

With the above definitions in mind, adding (26) and (27) obtains the measurement equation as $$(T_{1,n} + T_{4,n}) + (r_{ftotal,n} - r_{rtotal,n}) + (\epsilon_n - \gamma_n) = (1 + \alpha_n)(T_{2,n} + T_{3,n}) + 2\theta_n$$

$$(T_{1,n} - T_{2,n}) + (T_{4,n} - T_{3,n}) + (r_{ftotal,n} - r_{rtotal,n}) = 2\theta + \alpha_n(T_{2,n} + T_{3,n}) + (\gamma_n - \epsilon_n) \quad (28)$$

The measurement equation above can be rewritten as $$\frac{(T_{1,n} - T_{2,n}) + (T_{4,n} - T_{3,n}) + (r_{ftotal,n} - r_{rtotal,n})}{y_n} = \quad (29)$$

$$\frac{2\theta_n + \alpha_n(T_{2,n} + T_{3,n})}{D_n X_n} + \frac{(\gamma_n - \epsilon_n)}{v_n}$$

where n is a nonnegative time index, $\gamma_n = (T_{1,n} - T_{2,n}) + (T_{4,n} - T_{3,n}) + (r_{ftotal,n} - r_{rtotal,n})$ is a scalar, $D_n = [2(T_{2,n} + T_{3,n})]$ is a 1×2 matrix, $X_n^T = [\theta_n \ \alpha_n]$ is a vector, and $v_n = (\gamma_n - \epsilon_n)$ is the measurement noise.

Alternatively, in the case where the forward delay $d_f$ and reverse delay $d_r$ are unequal but are known (see equations (2) and (3)), the measurement equation can be obtained as $$\frac{(T_{1,n} - T_{2,n}) + (T_{4,n} - T_{3,n}) + (d_f - d_r) + (r_{ftotal,n} - r_{rtotal,n})}{y_n} = \quad (30)$$

$$\frac{2\theta_n + \alpha_n(T_{2,n} + T_{3,n})}{D_n X_n} + \frac{(\gamma_n - \epsilon_n)}{v_n}$$

where $y_n (T_{1,n} - T_{2,n}) + (T_{4,n} - T_{3,n}) + (d_f - d_r) + (r_{ftotal,n} - r_{rtotal,n})$ is a scalar. The quantity $(d_f - d_r)$ accounts for the fixed delay asymmetry in the system. The above more general equation allows for known delays and asymmetries to be accounted for in the Kalman Filter formulation.

The nth sampling interval is considered to be the period in which the nth Sync and nth Delay_Req messages exchanges occur.

Development of the State (Process) Equation

Next the clock (process) model parameters A and $w_n$ are derived. The clock skew between two points $T_{1,n}$ and $T_{1,n-1}$ can be estimated given two clock offsets $\theta_n$ and $\theta_{n-1}$ as $$\alpha_{n-1} = \frac{\theta_n - \theta_{n-1}}{T_{1,n} - T_{1,n-1}}. \quad (31)$$

The process dynamics for the clock while accounting for process noise can be expressed as $$\theta_n = \theta_{n-1} + \alpha_{n-1}(T_{1,n} - T_{1,n-1}) + w_{\theta,n}$$

$$\alpha_n = \alpha_{n-1} + w_{\alpha,n} \quad (32)$$

where $w_n^T = [w_{\theta,n} \ w_{\alpha,n}]$ is the process noise vector which is assumed to be drawn from a zero mean normal distribution with covariance $Q_n = E[w_n w_n^T]$. The system can be described by the following two-state dynamic model $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A X_{n-1} + w_n, \quad (33)$$

where $A_n$ is the known 2-by-2 state transition matrix. If the time between Sync messages is fixed, then, $\Delta T_n = (T_{1,n} - T_{1,n-1}) = \Delta t$ is a constant term, and $$A = \begin{bmatrix} 1 & (T_{1,n} - T_{1,n-1}) \\ 0 & 1 \end{bmatrix} = \begin{bmatrix} 1 & \Delta t \\ 0 & 1 \end{bmatrix}. \quad (34)$$

The clock offset ($\hat{\theta}$) and skew ($\hat{\alpha}$) estimated at the client using any of the above methods can be used to compute the server time $\hat{S}$ as illustrated in FIG. 12.

Syntonization of Transparent Clocks to Master

Consider the case where a TC contains a free-running oscillator with frequency accuracy no worse than ±100 ppm. If residence time is measured using this oscillator, there will be an error of the order of the residence time multiplied by the actual frequency offset. Optimum synchronization performance is obtained when all TCs on a synchronization path are frequency locked (syntonized) to the master clock. If a TC is not frequency synchronized to the GM, a TC with a ±100 ppm accuracy will contribute a measurement error of ±(0.0001×10 ms)=±1 μs (or ±1000 ns) to the residence time if the ideal residence time is 10 ms. A good thing is that oscillators do not typically operate at the extreme ends of their accuracy limits.

To reduce this error, IEEE 1588 Version 2 allows the TC to be syntonized, i.e., synchronized in frequency, to the GM. Each TC will use its own internal mechanisms to measure frequency offset relative to the GM and to synthesize a frequency signal that is syntonized with the GM. This synthesis may be done via hardware, firmware, or software.

Assume a network with nodes having standard Ethernet oscillators, with nominal rates of 25 MHz for 100 Mbit/s Ethernet and 125 MHz for 1 Gbit/s Ethernet. This means that the phase measurement granularity in the TC and ordinary clock can be as much as 40 ns. Additional phase error will result from the variable component of latency in the Ethernet physical layer (PHY) (the fixed component can be specified by the manufacturer in the design).

Consider the case of a syntonized TC local oscillator. If the frequency offset between the GM and TC oscillator is measured and a syntonized frequency is created, the use of this frequency for the TC delay computation will greatly reduce the magnitude of the TC measurement errors. The phase step magnitude will now be on the order of the syntonized frequency measurement accuracy multiplied by the synch interval. For example, if the phase measurement granularity is 40 ns (assuming a 25 MHz oscillator for 100 Mbit/s Ethernet) and the TC oscillator frequency offset is measured/syntonized over 100 ms, then the measured frequency offset is 40×10⁻⁹ s/0.1 s=400×10⁻⁹=0.4 ppm (parts-per-million). The TC measurement error or offset now is (400×10⁻⁹)(0.01 s)=4 ns, i.e., the TC measurement error is reduced from the 1000 ns computed when the free-running local oscillator is used for the measurement by a factor of 250. In practice, the reduction will not be this large because other effects are present, e.g., oscillator phase noise and drifts due to temperature effects, phase measurement error due to the variable portion of the PHY latency, and frequency measurement granularity.

Thus, to conclude, the timing options available for TC for delay measurements are:
  Both E2E and P2P TCs: A TC uses a local free-running oscillator embedded in the TC
  Both E2E and P2P TCs: A TC uses a signal that is syntonized with the GM
  P2P TCs Only: A TC uses a signal that is time synchronized to the GM. The TC computes a time offset which it uses to align its clock.

For most accurate residence time measurements, the PTP clocks in each TC should be syntonized with the GM. Syntonization only requires correction to the TC oscillator frequency. The TC host processor can use the ingress timestamps from Sync messages to determine a frequency (rate) correction required for the PTP clock. Alternatively, syntonization may be handled on the TC host processor without adjusting the frequency of the TC clocks. The frequency correction may be used to modify the computed residence times inserted into Follow_Up and Delay_Resp messages. This method may not be used with one-step operation.

Limits of using Unsyntonized Transparent Clocks

In this section the linear approximation model is used to derive simple limits of using unsyntonized TCs. It is assumed that the slave has no clock skew with respect to the master ($\alpha$=0) to allow us to determine the clock (time) offset error when the TCs are unsyntonized. If $\theta_s$ is the slave clock offset when the TCs are syntonized and the communication is over a symmetric path, then we can write the following $$\theta_s = \frac{(T_1 + T_4) - (T_2 + T_3) + (r_{ftotal} - r_{rtotal})}{2} \quad (35)$$

If $\theta_u$ is the slave clock offset when the TCs are unsyntonized and it is assumed that only one TC on the communication path with skew $\alpha_{TC}$ then the following results $$\theta_u = \frac{(T_1 + T_4) - (T_2 + T_3) + (1 + \alpha_{TC})(r_{ftotal} - r_{rtotal})}{2} \quad (36)$$

Then the clock offset error due to unsyntonized TC is given as $$\theta_e = \theta_u - \theta_s = \frac{\alpha_{TC}(r_{ftotal} - r_{rtotal})}{2} \quad (37)$$

If the skew of the TC is off by $\alpha_{TC}$=100 ppm (maximum frequency offset for Ethernet) from the master, then $$\theta_e = \frac{10^{-4}(r_{ftotal} - r_{rtotal})}{2}$$

For some mobile wireless (see [1]), $\theta_e$ is required to be no more than 1 microsecond. For this case $$10^{-6} \geq \frac{10^{-4}(r_{ftotal} - r_{rtotal})}{2}$$

$$(r_{ftotal} - r_{rtotal}) \leq 0.2 \text{ ms}$$

If $\alpha_{TC}$=−100 ppm, then $(r_{rtotal}-r_{ftotal})\leq 0.2$ ms. This means that for $\alpha_{TC}$=±100 ppm, the offset error will not be greater than 1 microsecond if the maximum asymmetry in the forward and reverse cumulative residence times is not greater than 0.2 ms or (200 microseconds). This means unsyntonized Ethernet switches can be used as long as this asymmetry is not exceeded. Note that this is for the maximum TC skew of 100 ppm. Larger asymmetries can be tolerated if the TC skews are smaller. This analysis shows that unsyntonized TCs can be used as long as certain conditions are met. Thus, the accuracy of the residence time measurement and insertion into the PTP message has a direct consequence to the synchronization accuracy.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. ITU-T Recommendation G.8271/Y.1366, Time and phase synchronization aspects of packet networks, February 2012.

[2]. R. E. Kalman, "A New Approach to Linear Filtering and Prediction Problems," *Transaction of the ASME—Journal of Basic Engineering*, March 1960, pp. 35-45.

All references referred to above are hereby incorporated by reference.

The invention claimed is:

1. A method for estimating the skew and offset of a slave clock in a slave device in relation to a master clock in a master device, the slave device and the master device being connected by a network, the method including the steps of:

exchanging timing messages between the master device and the slave device over the network, each timing message passing through at least one end-to-end transparent clock;

recording timestamps which are the times of the sending and receiving said messages according to the respective clocks;

recording the residence times, $r_{ftotal,n}$ and $r_{rtotal,n}$, which are the residence times of the nth packet in the forward and reverse directions respectively, of each message passing through the or each transparent clock;

estimating the skew and offset of the slave clock using the said timestamps and said residence times; and synchronizing the output of the slave clock to the master clock using said estimated offset and skew; and wherein the step of estimating the skew and offset estimates the skew $\alpha$ as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1}) + (r_{ftotal,n} - r_{ftotal,n-1})}{(T_{2,n} - T_{2,n-1})} - 1$$

&

$$\alpha_2 = \frac{(T_{4,n} - T_{4,n-1}) + (r_{rtotal,n} - r_{rtotal,n-1})}{(T_{3,n} - T_{3,n-1})} - 1,$$

wherein $T_{1,n}$ is the time of departure of the nth Sync message as measured by the master clock;

$T_{2,n}$ is the time of receipt as recorded by the slave clock on receipt of the nth Sync message;

$T_{3,n}$ is the time of transmission of the nth Delay_Req message as recorded by the slave clock;

$T_{4,n}$ is the time of receipt of the nth Delay_Req message as recorded by the master clock; and $r_{ftotal,n}$ and $r_{rtotal,n}$ are the residence times of the nth packet in the forward and reverse directions respectively, of each message passing through the or each transparent clock, estimates the offset $\theta$ as $$\theta = \frac{(T_{1,n} + T_{4,n}) - (1 + \alpha)(T_{2,n} + T_{3,n})}{2} + \frac{(d_f - d_r)}{2} + \frac{(r_{rtotal,n} - r_{ftotal,n})}{2},$$

wherein:

$d_f$ is the fixed physical link delay in the forward direction; and $d_r$ is the fixed physical link delay in the reverse direction, and updates the offset and skew according to the update equations:

$$\hat{\alpha}_n = \mu\alpha_n + (1-\mu)\hat{\alpha}_{n-1},\ 0<\mu<1 \text{ and}$$

$$\hat{\theta}_n = \mu\theta_n + (1-\mu)\hat{\theta}_{n-1},\ 0<\mu<1.$$

2. A method according to claim 1 wherein the step of estimating the skew and offset uses an exponentially weighted moving average filter applied to said timestamps and said residence times.

3. A method according to claim 1 wherein the step of estimating the skew and offset uses a Kalman filter.

4. A method according to claim 3 wherein, to estimate the skew $\alpha_n$ and the offset $\theta_n$ at time n, the Kalman filter is applied to:
the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and
to the measurement equation $$y_n = D_n X_n + v_n$$

wherein:
$y_n = (T_{1,n} - T_{2,n}) + (T_{4,n} - T_{3,n}) + (d_f - d_r) + (r_{ftotal,n} - r_{ntotal,n})$ is a scalar,
$D_n = [2 \ (T_{2,n} + T_{3,n})]$ is a 1×2 matrix,
$X_n^T = [\theta_n \ \alpha_n]$ is a vector and
$v_n = (\gamma_n - \epsilon_n)$ is the measurement noise, and wherein:
$T_{1,n}$ is the time of departure of the nth Sync message as measured by the master clock;
$T_{2,n}$ is the time of receipt as recorded by the slave clock on receipt of the nth Sync message;
$T_{3,n}$ is the time of transmission of the nth Delay_Req message as recorded by the slave clock;
$T_{4,n}$ is the time of receipt of the nth Delay_Req message as recorded by the master clock;
$r_{ftotal,n}$ and $r_{rtotal,n}$ are the residence times of the nth packet in the forward and reverse directions respectively, of each message passing through the or each transparent clock,
$d_f$ is the fixed physical link delay in the forward direction; and
$d_r$ is the fixed physical link delay in the reverse direction,
$\epsilon$ is the stochastic delay in the transmission of messages between the master and the slave device; and
$\gamma$ is the stochastic delay in the transmission of messages between the slave and the master device.

5. A slave device connected to a master device having a master clock by a network containing at least one end-to-end transparent clock, the slave device having a slave clock and a processor, the slave device being arranged to:
exchange timing messages with the master device over said network and record timestamps which are the times of sending and receiving said messages according to the respective clocks; and
extract from said messages the residence times, $r_{ftotal,n}$ and $r_{rtotal,n}$, which are the residence times of the nth packet in the forward and reverse directions respectively, of each message passing through the or each transparent clock, wherein:
the processor is arranged to:
estimate the skew and offset of the slave clock compared to the master clock using said timestamps and said residence times; and
wherein the processor is further arranged to synchronize the output of the slave clock to the master clock using said estimated offset and skew; and
wherein the processor estimates the skew $\alpha$ as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1}) + (r_{ftotal,n} - r_{ftotal,n-1})}{(T_{2,n} - T_{2,n-1})} - 1$$

&

$$\alpha_2 = \frac{(T_{4,n} - T_{4,n-1}) + (r_{rtotal,n} - r_{rtotal,n-1})}{(T_{3,n} - T_{3,n-1})} - 1,$$

wherein
$T_{1,n}$ is the time of departure of the nth Sync message as measured by the master clock;
$T_{2,n}$ is the time of receipt as recorded by the slave clock on receipt of the nth Sync message;
$T_{3,n}$ is the time of transmission of the nth Delay_Req message as recorded by the slave clock;
$T_{4,n}$ is the time of receipt of the nth Delay_Req message as recorded by the master clock; and
$r_{ftotal,n}$ and $r_{rtotal,n}$ are the residence times of the nth packet in the forward and reverse directions respectively, of each message passing through the or each transparent clock,
estimates the offset $\theta$ as $$\theta = \frac{(T_{1,n} + T_{4,n}) - (1 + \alpha)(T_{2,n} + T_{3,n})}{2} + \frac{(d_f - d_r)}{2} + \frac{(r_{ftotal,n} - r_{rtotal,n})}{2},$$

wherein:
$d_f$ is the fixed physical link delay in the forward direction; and
$d_r$ is the fixed physical link delay in the reverse direction,
and updates the offset and skew according to the update equations:

$\hat{\alpha}_n = \mu \alpha_n + (1-\mu)\hat{\alpha}_{n-1}$, $0 < \mu < 1$ and $\hat{\theta}_n = \mu \theta_n + (1-\mu)\hat{\theta}_{n-1}$, $0 < \mu < 1$.

6. A slave device according to claim 5 wherein the processor estimates the skew and offset using an exponentially weighted moving average filter applied to said timestamps and said residence times.

7. A slave device according to claim 5 wherein the processor estimates the skew and offset using a Kalman filter.

8. A slave device according to claim 7 wherein, to estimate the skew $\alpha_n$ and the offset $\theta_n$ at time n, the Kalman filter is applied to:
the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and
to the measurement equation $$y_n = D_n X_n + v_n$$

wherein:
$y_n = (T_{1,n} - T_{2,n}) + (T_{4,n} - T_{3,n}) + (d_f - d_r) + (r_{ftotal,n} - r_{rtotal,n})$ is a scalar,
$D_n = [2 \ (T_{2,n} + T_{3,n})]$ is a 1×2 matrix,
$X_n^T = [\theta_n \ \alpha_n]$ is a vector and
$v_n = (\gamma_n - \epsilon_n)$ is the measurement noise, and wherein:
$T_{1,n}$ is the time of departure of the nth Sync message as measured by the master clock;

$T_{2,n}$ is the time of receipt as recorded by the slave clock on receipt of the nth Sync message;

$T_{3,n}$ is the time of transmission of the nth Delay_Req message as recorded by the slave clock;

$T_{4,n}$ is the time of receipt of the nth Delay_Req message as recorded by the master clock;

$r_{ftotal,n}$ and $r_{rtotal,n}$ are the residence times of the nth packet in the forward and reverse directions respectively, of each message passing through the or each transparent clock;

$d_f$ is the fixed physical link delay in the forward direction; and $d_r$ is the fixed physical link delay in the reverse direction, $\epsilon$ is the stochastic delay in the transmission of messages between the master and the slave device; and $\gamma$ is the stochastic delay in the transmission of messages between the slave and the master device.

9. A system including:

a master device having a master clock;

a slave device having a slave clock and a processor; and a network connecting said master device and said slave device and having at least one end-to-end transparent clock, wherein the slave device is arranged to:
  exchange timing messages with the master device over said network and record timestamps which are the times of sending and receiving said messages according to the respective clocks;

the or each transparent clock is arranged to:
  record the residence times, $r_{ftotal,n}$ and $r_{rtotal,n}$, which are the residence times of the nth packet in the forward and reverse directions respectively, of each message passing through the transparent clock, and further wherein:

the processor is arranged to:
  estimate the skew and offset of the slave clock compared to the master clock using said timestamps and said residence times; and wherein the processor is further arranged to synchronize the output of the slave clock to the master clock using said estimated offset and skew; and wherein the processor estimates the skew $\alpha$ as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1}) + (r_{ftotal,n} - r_{ftotal,n-1})}{(T_{2,n} - T_{2,n-1})} - 1$$

&

$$\alpha_2 = \frac{(T_{4,n} - T_{4,n-1}) + (r_{rtotal,n} - r_{rtotal,n-1})}{(T_{3,n} - T_{3,n-1})} - 1,$$

wherein $T_{1,n}$ is the time of departure of the nth Sync message as measured by the master clock;

$T_{2,n}$ is the time of receipt as recorded by the slave clock on receipt of the nth Sync message;

$T_{3,n}$ is the time of transmission of the nth Delay_Req message as recorded by the slave clock;

$T_{4,n}$ is the time of receipt of the nth Delay_Req message as recorded by the master clock; and $r_{ftotal,n}$ and $r_{rtotal,n}$ are the residence times of the nth packet in the forward and reverse directions respectively, of each message passing through the or each transparent clock, estimates the offset $\theta$ as $$\theta = \frac{(T_{1,n} + T_{4,n}) - (1 + \alpha)(T_{2,n} + T_{3,n})}{2} + \frac{(d_f - d_r)}{2} + \frac{(r_{ftotal,n} - r_{rtotal,n})}{2},$$

wherein:

$d_f$ is the fixed physical link delay in the forward direction; and $d_r$ is the fixed physical link delay in the reverse direction, and updates the offset and skew according to the update equations:

$\hat{\alpha}_n = \mu\alpha_n + (1-\mu)\hat{\alpha}_{n-1}$, $0 < \mu < 1$ and $\hat{\theta}_n = \mu\theta_n + (1-\mu)\hat{\theta}_{n-1}$, $0 < \mu < 1$.

10. A system according to claim 9 wherein the processor estimates the skew and offset using an exponentially weighted moving average filter applied to said timestamps and said residence times.

11. A slave device according to claim 9 wherein the processor estimates the skew and offset using a Kalman filter.

12. A slave device according to claim 11 wherein, to estimate the skew $\alpha_n$ and the offset $\theta_n$ at time n, the Kalman filter is applied to:

the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and to the measurement equation $y_n = D_n X_n + v_n$ wherein:

$y_n = (T_{1,n} - T_{2,n}) + (T_{4,n} - T_{3,n}) + (d_f - d_r) + r_{ftotal,n} - r_{rtotal,n})$ is scalar, $D_n = [2 \ (T_{2,n} + T_{3,n})]$ is a 1×2 matrix, $X_n^T = [\theta_n \ \alpha_n]$ is a vector and $v_n = (\gamma_n - \epsilon_n)$ is the measurement noise, and wherein:

$T_{1,n}$ is the time of departure of the nth Sync message as measured by the master clock;

$T_{2,n}$ is the time of receipt as recorded by the slave clock on receipt of the nth Sync message;

$T_{3,n}$ is the time of transmission of the nth Delay_Req message as recorded by the slave clock;

$T_{45n}$ is the time of receipt of the nth Delay_Req message as recorded by the master clock;

$r_{ftotal,n}$ and $r_{rtotal,n}$ are the residence times of the nth packet in the forward and reverse directions respectively, of each message passing through the or each transparent clock, $d_f$ is the fixed physical link delay in the forward direction; and $d_r$ is the fixed physical link delay in the reverse direction, $\epsilon$ is the stochastic delay in the transmission of messages between the master and the slave device; and $\gamma$ is the stochastic delay in the transmission of messages between the slave and the master device.

* * * * *